United States Patent [19]

Narita

[11] Patent Number: 4,845,618

[45] Date of Patent: Jul. 4, 1989

[54] HYDRAULIC PRESSURE CONTROL FOR REDUCING ENGAGEMENT SHOCK OF AUTOMATIC TRANSMISSION

[75] Inventor: Yasushi Narita, Yokohama City, Japan

[73] Assignee: Nissan Motor Company, Ltd., Japan

[21] Appl. No.: 71,387

[22] Filed: Jul. 9, 1987

[30] Foreign Application Priority Data

Jul. 10, 1986 [JP] Japan ................................. 61-162755

[51] Int. Cl.$^4$ ........................ G06F 15/50; B60K 41/18
[52] U.S. Cl. .................................... 364/424.1; 74/866; 192/0.034
[58] Field of Search ............... 364/424.1; 74/866, 867, 74/868, 869; 192/0.032, 0.034, 3.31

[56] References Cited

U.S. PATENT DOCUMENTS 4,474,082 10/1984 Spokas et al. .......................... 74/866
4,502,354 3/1985 Suzuki et al. .......................... 74/866

FOREIGN PATENT DOCUMENTS

2805544 8/1979 Fed. Rep. of Germany ........ 74/866
57-47056 3/1982 Japan .

Primary Examiner—Eugene R. LaRoche
Assistant Examiner—Nathan W. McCutcheon
Attorney, Agent, or Firm—Leydig, Voit & Mayer

[57] ABSTRACT

A hydraulic pressure control system for reducing engagement shock of a frictional element when the transmission effects a change in gear position comprises an electromagnetically operated valve for generating a hydraulic pressure supplied to the frictional element and a control unit. In the control unit, the amount of torque transmitted via a torque converter to a transmission input shaft is determined through operations based on output signals of various sensors and data stored in a memory, and a target value of hydraulic pressure is determined in response to the amount of torque determined. The control unit supplies an output signal to the valve to cause the valve to adjust the level of the hydraulic pressure generated thereby to the target value.

8 Claims, 6 Drawing Sheets

HYDRAULIC PRESSURE CONTROL FOR REDUCING ENGAGEMENT SHOCK OF AUTOMATIC TRANSMISSION

BACKGROUND OF THE PRESENT INVENTION

The present invention relates to a hydraulic pressure control system for controlling shocks occurring upon engagement of a torque transmitting frictional element that is engaged to effect shifting between gear positions in an automatic transmission.

Vehicular automatic transmissions are known wherein in response to the vehicle operating conditions shifting between gear positions is effected automatically by supplying hydraulic fluid pressure to a selected one or ones of frictional elements. U.S. Pat. No. 4,502,354 (corresponding to JP-A-57-47056) discloses a hydraulic pressure control system wherein in order to reduce shift shock during a change in gear positions, a frictional element actuating hydraulic pressure (a line pressure) is maintained equal to the magnitude of a target hydraulic pressure for a predetermined holding time. According to this known control system, the magnitude of the target hydraulic pressure is determined as a function of an engine load signal, viz., a throttle opening, so that if the throttle opening fails to represent the magnitude of an input torque to the transmission after a long use of the engine, substantial shift shock will occur. Besides, if the engines different in engine torque for the same throttle opening are used, the same hydraulic control system can not be used in association with the different engines.

An object of the present invention is to provide a hydraulic pressure control which can be used in association with different engines having different output vs. throttle opening characteristic curves.

SUMMARY OF THE INVENTION

According to the present invention, there is provided a hydraulic pressure control system for reducing engagement shock of a frictional element in an automatic transmission, the automatic transmission having a transmission input shaft and a transmission output shaft, the transmission input shaft being drivingly connected to a turbine runner of a hydrodynamic torque transmitting device which has a pump impeller drivingly connected to a crankshaft of an engine. The control system comprises:

means for generating a hydraulic pressure supplied to the frictional element;

means for controlling said hydraulic pressure generating means such that the level of the hydraulic pressure generated is adjusted to a target value of hydraulic pressure.

said controlling means including means for determining the torque transmitted via the hydrodynamic torque transmitting device to the transmission input shaft, and determining the target value in response to the amount of torque.

More specifically, a hydraulic pressure control system comprises an electromagnetically operated valve for generating a hydraulic pressure supplied to the frictional element, and a control unit. In the control unit, the amount of torque transmitted via a torque converter to a transmission input shaft is determined through operations based on output signals of various sensors and stored data in a memory, and a target value of hydraulic pressure is determined in response to the amount of torque determined. The control unit supplies an output signal to the valve to cause the valve to adjust the level of the hydraulic pressure generated thereby to the target value.

DESCRIPTION OF THE EMBODIMENT

Figure 1:
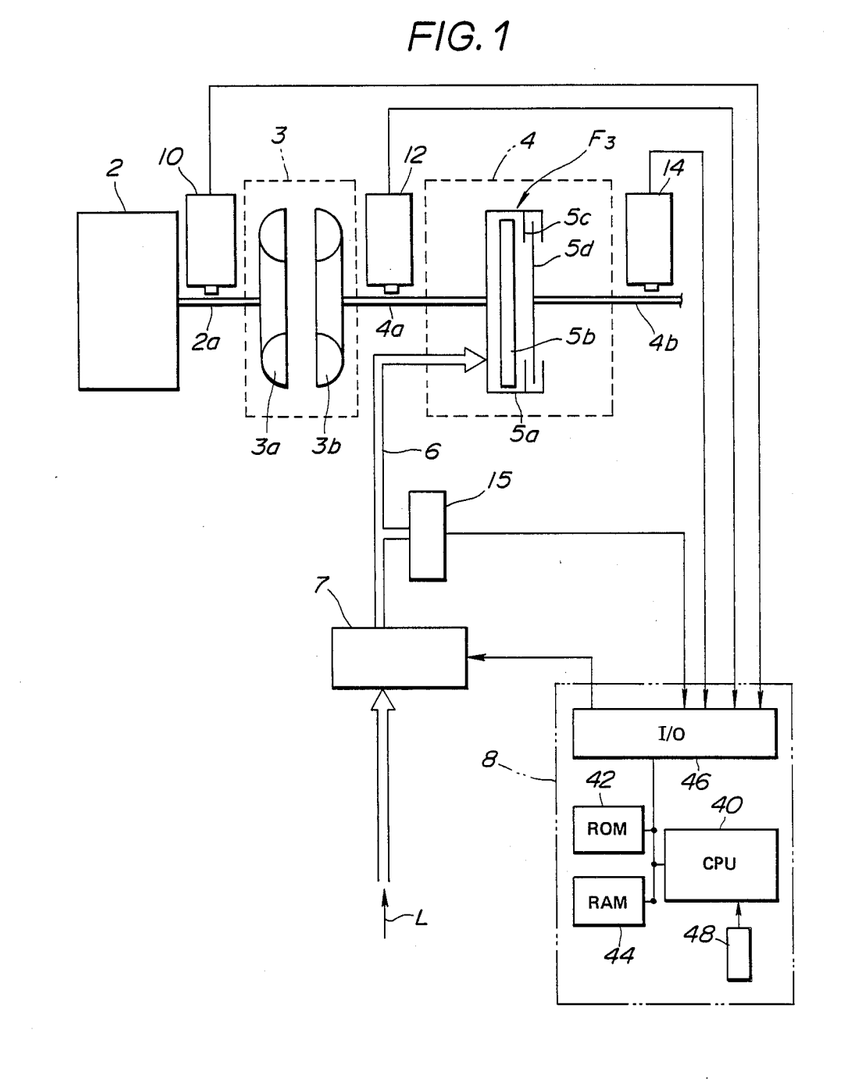
FIG. 1 is a block diagram showing an embodiment of a hydraulic pressure control system according to the present invention.

Referring to FIG. 1, a hydraulic pressure control system according to the present invention described. Reference numeral 2 designates an engine, 3 a hydrodynamic torque transmitting device in the form of a torque converter, and 4 a gear train for an automatic transmission. The torque converter 3 includes a pump impeller 3a drivingly connected to a crankshaft 2a of the engine 2 and a turbine runner 3b drivingly connected via a turbine shaft to a transmission input shaft 4a.

Figure 2:
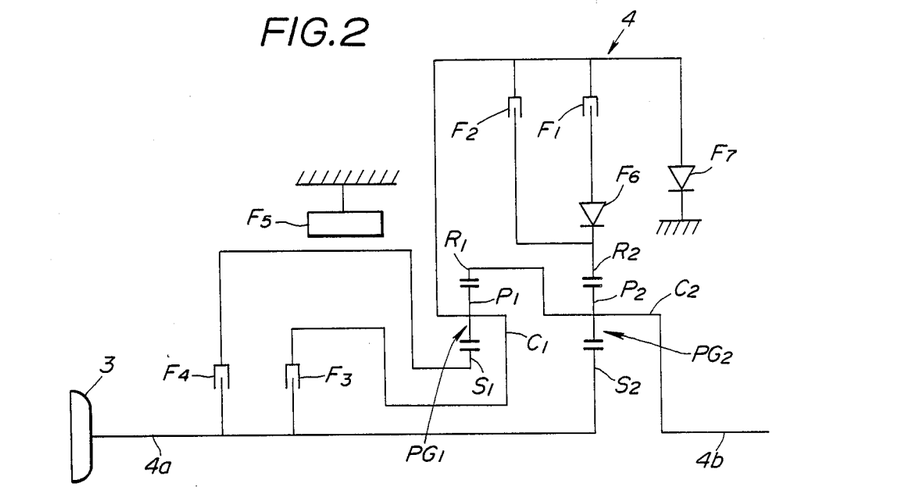
FIG. 2 is a schematic view of a power train of an automatic transmission associated with the control system.

One example of the structure of the gear train 4 is described referring to FIG. 2. As shown in FIG. 2, the automatic transmission is connected to the torque converter 3 via the input shaft 4a, and it comprises a transmission output shaft 4b, a first planetary gear set $PG_1$, and a second planetary gear set $PG_2$. The first planetary gear set $PG_1$ includes a sun gear $S_1$ connectable via a clutch $F_4$ to the transmission input shaft 4a, a ring gear $R_1$, planetary pinions $P_1$ meshing both with the sun and ring gears $S_1$ and $R_1$, and a carrier $C_1$ rotatably supporting the planetary pinions $P_1$. The carrier $C_1$ is connectable via a clutch $F_3$ to the transmission input shaft 4a. The second planetary gear set 4b includes a sun gear $S_2$ connected to the transmission input shaft 4a, a ring gear $R_2$, planetary pinions $P_2$ meshing both with the sun and ring gears $S_2$ and $R_2$, and a carrier $C_2$ rotatably supporting the planetary pinions $P_2$. The carrier $C_2$ is connected to the ring gear $R_1$ and also to the transmission output shaft 4b. The carrier $C_1$ is connectable via a clutch $F_2$ to the ring gear $R_2$, it is also connectable via an overruning clutch $F_6$ when a clutch $F_1$ is engaged. A brake $F_3$ is provided to hold the sun gear $S_1$ stationary. One-way clutch $F_7$ is operatively disposed between the carrier $C_1$ and a stationary portion of the transmission.

The above mentioned frictional elements are engaged and disengaged in a predetermined schedule to provide four forward ratios and one reverse ratio as shown in the following Table.

TABLE

| Ratio | $F_1$ | $F_6$ | $F_2$ | $F_5$ | $F_3$ | $F_7$ | $F_4$ |
|---|---|---|---|---|---|---|---|
| 1 |   | o | (o) |   |   | o |   |
| 2 |   | o | (o) | o |   |   |   |
| 3 |   | o | (o) |   | o |   |   |
| 4 | o |   |   | o | o |   |   |
| R |   |   |   |   |   |   | o |

In the above Table, the sign "o" represents that a particular fricional element is engaged, and thus no sign means that the particular frictional element is released. The sign "(o)" means that a particular frictional element is engaged during engine brake operation.

In the hydraulic pressure control system according to the present invention, any of the torque transmitting frictional elements $F_2$, $F_5$, and $F_3$ may be hydralically controlled. In the illustrated embodiment in FIG. 1, among them the clutch $F_3$ is hydraulically controlled so as to reduce shocks occurring when the clutch $F_3$ is engaged to effect shifting between different gear positions in the automatic transmission. Although shown diagrammatically in FIG. 1, the clutch $F_3$ is constructed of a multi-plate clutch which is designed to be engaged through firm engagement of drive plates $5c$ and driven plates, only one being shown at $5d$, under a bias force by a piston $5b$ as a result of a stroke of the piston $5b$ in response to pressure build-up within a cylinder $5a$. The clutch $F_3$ is released as a result of discharge of hydraulic fluid from the cylinder $5a$.

Connected to the cylinder $5a$ is a hydraulic fluid supply line 6. Supplied to the hydraulic fluid supply line 6 is a line fluid pressure designated by an arrow L. An actuator in the form of an electromagnetically operated proportional type valve 7 is provided at a portion of the hydraulic fluid supply line 6 to control flow rate of hydraulic fluid supplied to the cylinder $5a$ of the clutch $F_3$. This valve 7 is activated in response to an output signal from a microcomputer based control unit 8.

Figure 3:
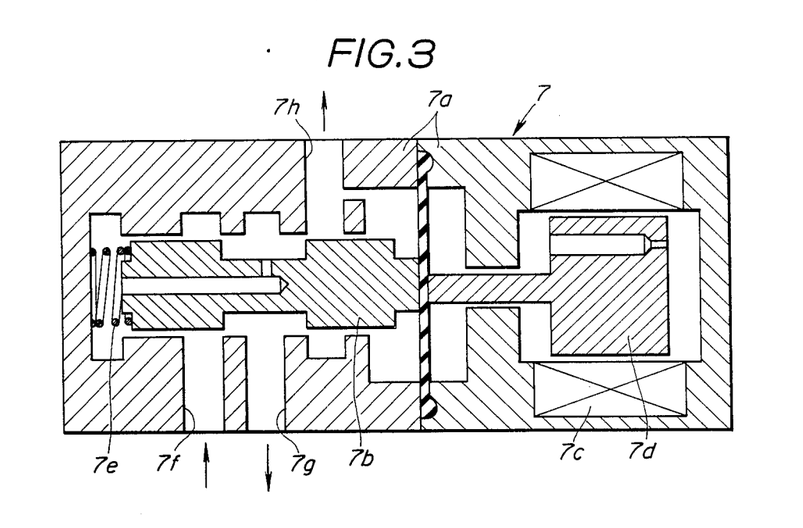
FIG. 3 is a diagrammatic sectional view illustrating a proportional-type solenoid-operated actuator.

The structure of the above mentioned electromagnetically operated valve 7 is diagrammatically illustrated in FIG. 3. The solenoid valve 7 includes a valve body $7a$, a spool $7b$, and a plunger $7d$ that is electromagnetically activated by a solenoid $7c$. When the plunger $7d$ is activated, the plunger $7d$ is moved to the left as viewed in FIG. 3, urging the spool $7b$ against a bias action of a spring $7e$. The valve body $7a$ is provided with an inlet port $7f$, an outlet port $7g$, and a drain port $7h$. The inlet port $7f$ communicable with a source of line pressure so that hydraulic fluid flows via the inlet port $7f$, and the outlet port $7g$ to the cylinder $5a$. In the illustrated position of the spool $7b$, a fluid communication between the outlet port $7g$ with the inlet port $7f$ and a fluid communication between the outlet port $7g$ and the drain port $7h$ are blocked. If the spool $7b$ is moved from the illustrated position to the left as viewed in FIG. 3, the outlet port $7b$ is allowed to communicate with the inlet port $7f$, allowing the supply of hydraulic fluid to the cylinder $5a$ of the clutch $F_3$. If the spool $7b$ is moved from the illustrated position to the right as viewed in FIG. 3, the outlet port $7g$ is allowed to communicate with the drain port $7h$, allowing the discharge of hydraulic fluid from the cylinder $5a$ of the clutch $F_3$. As will be noted from the illustration shown in FIG. 3, the hydraulic pressure within the outlet port $7g$ is applied via an axial bore formed through the spool $7b$ to a spring chamber where the spring $7e$ is arranged, thus assisting the spring $7e$ in biasing the spool $7b$ to the right as viewed in FIG. 3.

Figure 6A:
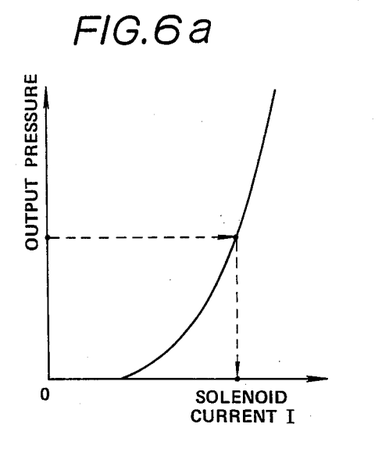
FIG. 6a is a characteristic curve of output pressure as a function of input solenoid current.

FIG. 6a shows the relationship between output hydraulic pressure generated within the outlet port $7g$ and the intensity I of electric current flowing through the solenoid $7c$. As will be noted from this relationship, there is a one-to-one correspondance between the output hydraulic pressure and the electric current flowing through the solenoid $7c$.

Referring back to FIG. 1, three rotational speed sensors 10, 12 and 14 are provided. One sensor is an engine crankshaft rotational speed sensor 10 arranged to measure a revolution speed of the crankshaft $2a$, another sensor is a transmission input shaft rotational speed sensor 12 arranged to measure rotational speed of the transmission input shaft $4a$ (or the rotational speed of the turbine $3b$ of the torque converter 3). The other sensor is a transmission output shaft rotational speed sensor 14 arranged to measure the rotational speed of the transmission output shaft $4b$. A hydraulic pressure sensor 15 is arranged to measure the output hydraulic pressure of the electromagnetically operated valve 7. Output signals of the sensor 10, 12, 14, and 15 are supplied to the control unit 8. An output signal of the control unit 8 is supplied to the electromagnetically operated valve 7. The control unit 8 includes a microcomputer including a central processor unit 40 (hereinafter called as CPU) which operates based on the control program and control data stored in a read only memory 42 (abbreviated hereinafter as ROM). The output signals of the sensors 10, 12, 14, and 15 are converted by corresponding unillustrated converters (such as an A/D converter) into binary coded values. These binary coded values are stored by a random access memory 44 (abbreviated as RAM) via an input output interface 46 (abbreviated as I/O). The CPU 40 operates based on the stored data and the stored program within the RAM 44 and ROM 42 so as to control the frictional element actuating hydraulic fluid pressure and generates through the I/O 46 the solenoid drive signal supplied to the solenoid $7c$ of the electromagnetically operated valve 7.

Figure 4:
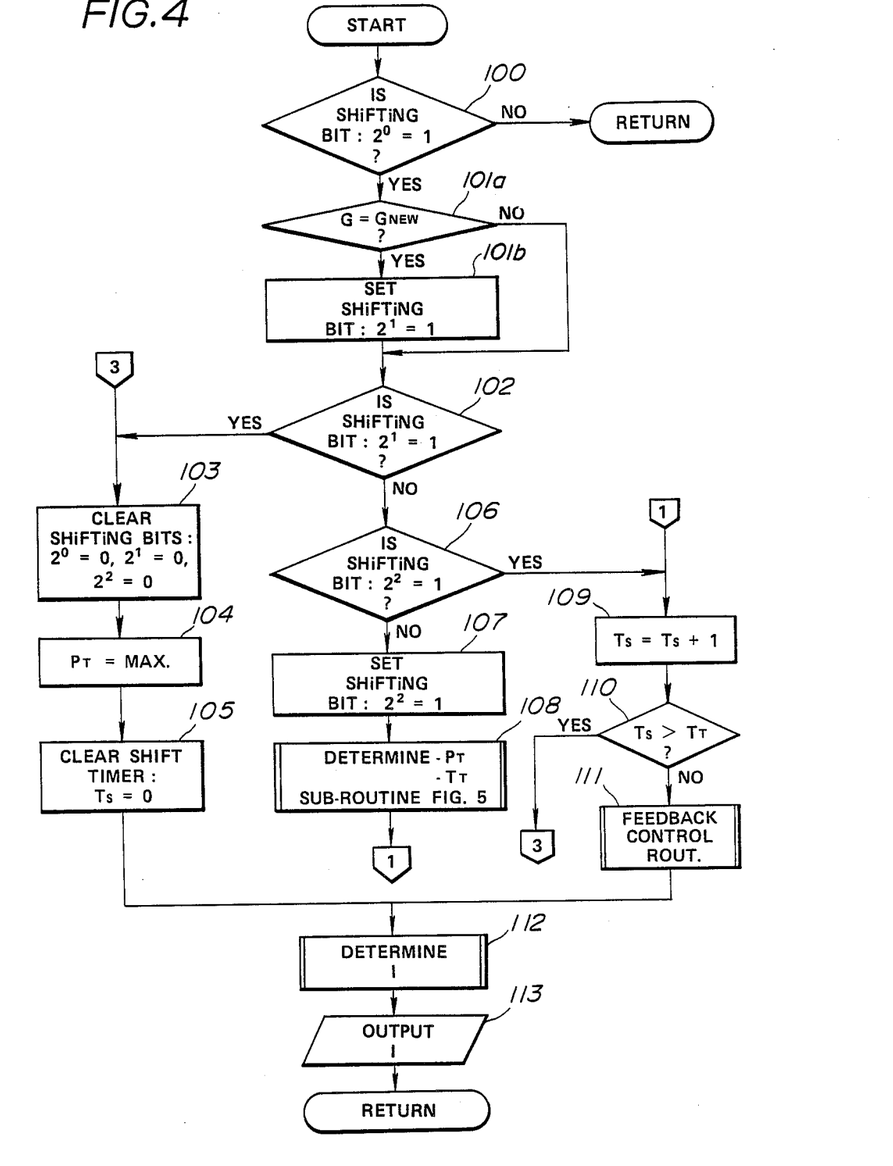
FIG. 4 is a flowchart of jobs performed by the control system.
Figure 5:
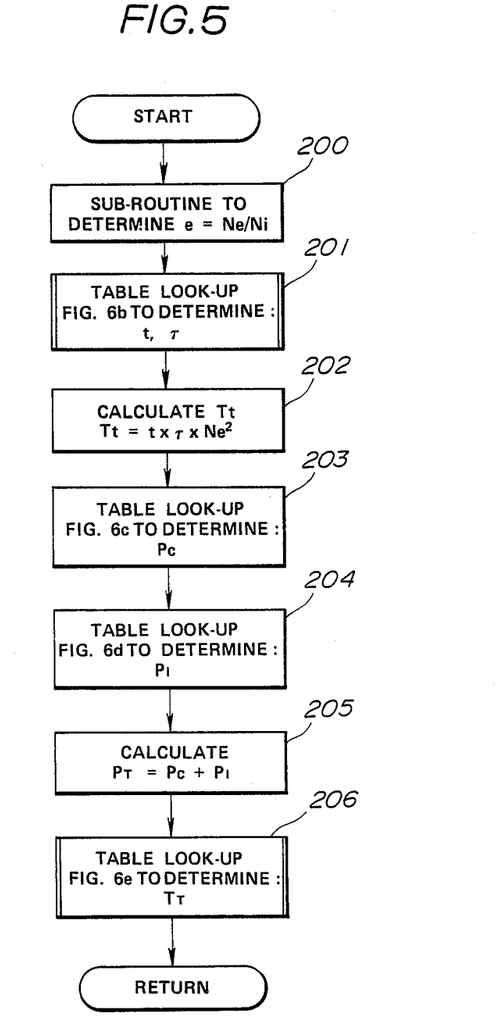
FIG. 5 is a flowchart of jobs performed by the control system to determine the magnitude of a target hydraulic pressure $P_T$ and the length of time required for a change between gear positions.

The mode of operation of the hydraulic pressure control system as mentioned above using the microcomputer is explained along with flowcharts of control programs shown in FIGS. 4 and 5.

FIG. 4 is a flowchart of a program showing an interrupt routine used in cooperation with an unillustrated main program for affecting line pressure control. The program shown in FIG. 4 operates in response to an interrupt signal which is generated at regular, predetermined intervals by a timer 48.

FIG. 5 is a flowchart of a program showing a subroutine for determining values of a target hydraulic pressure $P_T$ and the time required for shifting between gear positions.

The following Table (Table 2) sets forth the basic meaning of characteristic address names used in connection with the flowcharts of FIGS. 4 and 5.

TABLE 2

Figure 6B:
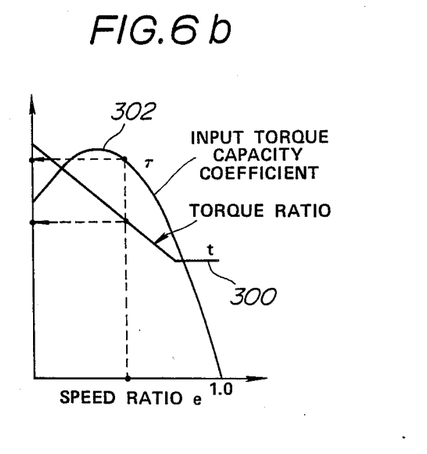
FIG. 6b shows performance characteristic curves as a function of the speed ratio of an input member of the torque converter to an output member thereof.
Figure 7:
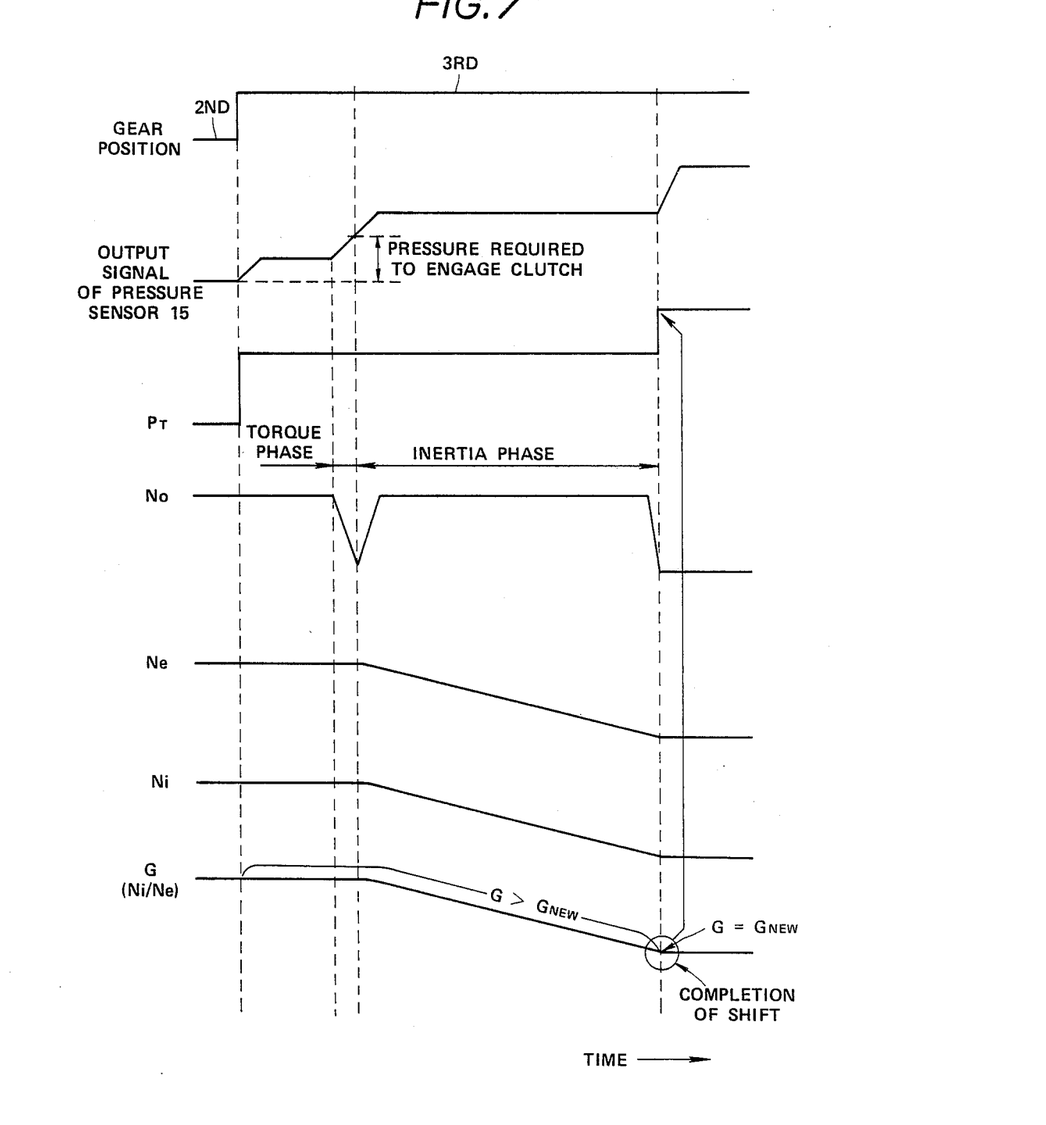
FIG. 7 is a timing diagram showing variations of various signals over time.

| Address Name | Content |
| --- | --- |
| SHiFTiNG BIT 0 ($2^0$) | assumes a value 1 in response to a change (a shift command) in a gear position state indicative signal which is shown in FIG. 7. |
| SHiFTiNG BIT 1 ($2^1$) | assumes a value 1 in response to the completion of a gear shifting operation initiated by a shift command. |
| SHiFTiNG BIT 2 ($2^2$) | assumes a value 1 indicating that pressure control of hydraulic fluid supplied to a frictional element is being carried out. |
| G | stores a value of a gear ratio resulting from calculation of Ni/No. |
| $G_{NEW}$ | stores a value of a gear ratio which is predetermined for each of gear positions. |
| $T_S$ | a shift timer. |
| $T_T$ | stores a value of a time required for shifting operation initiated by a shift command. |
| $P_T$ | stores a value of a target hydraulic pressure of hydraulic fluid to be supplied to a frictional element. |
| I | stores a value of a duty factor indicative of the intensity of current flowing through a solenoid 7c shown in FIG. 3. |
| e | stores a value of a speed ratio resulting from calculation of Ne/Ni. |
| t | stores a value of a torque ratio of a torque converter 3, which value is retrievable by table look-up of data as illustrated in FIG. 6b. |
| $\tau$ (tau) | stores a value of an input torque capacity coefficient of the torque converter 3, which value is retrievable by table look-up of data as illustrated in FIG. 6b. |
| Ne | stores a value of an engine revolution speed measured by a sensor 10. |
| Ni | stores a value of a transmission input shaft revolution speed measured by a sensor 12. |
| No | stores a value of a transmission output shaft revolution speed measured by a sensor 14. |
| Tt | stores a value of a torque transmitted to the transmission input shaft 4a by the torque converter 3, which value results from calculation of t × $\tau$ (tau) × $Ne^2$. |
| $P_C$ | stores a value of hydraulic pressure required to engage a friction element. |
| $P_I$ | stores a value of hydraulic pressure required to cause an inertia change in the power train to shift the state of the power train between gear positions. |
| I | stores a duty factor indicative of the intensity of electric current supplied to a solenoid 7c. |

Hereinafter, the program are explained along with the flowcharts shown in FIGS. 4 and 5.

In step 100, a decision is made whether the content of bit 1 of the address SHiFTING is set equal to 1. Before proceeding further with explanation of the control programs, a brief explanation will be made how bit 1 of address SHiFTING is set equal to 1. The microcomputer determines proper gear position based on output signals of various position sensors provided to detect positions assumed by various shift valves, such as a 1–2 shift valve, a 2–3 shift valve, or a 3–4 shift valve. Bit 1 of the address SHiFTING is set equal to 1 in response to a predetermined change in the proper gear position from one gear to another gear, such as from the second gear to the third gear. A gear shift table is stored in the ROM 42. The table is utilized to store digital values corresponding to data of gear ratios. The computer utilizes the table to perform a table look-up operation to determine the proper gear as a function of vehicle speed value and throttle opening degree value.

In the step 100, if bit 1 of address SHiFTING is not set equal to 1, control returns to the main program. If bit 1 of address SHiFTING is set equal 1, the program goes to step 101a where a decision is made whether the content of address G is equal to the content of address $G_{NEW}$. Although of not shown in FIG. 4, there are steps to transfer a proper predetermined gear ratio value to address $G_{NEW}$ corresponding to the gear position determined by the computer, to read output signals of the revolution speed sensors 12 and 14 via the I/O 46 and store the data as digital values in the addresses Ni and No, respectively, and to calculate Ni/No and store the result in address G. A variation in the content of the address G is illustrated in FIG. 7. In step 101a, if the content of the address G is not equal to the content of $G_{NEW}$, the program goes to step 102, while if the content of the address G is set equal to the content of $G_{NEW}$, the program goes to step 101b where bit 2 of address SHiFTING is set equal to 1 and then to step 102. In step 102, a decision is made whether bit 1 of address SHiFTING is equal to 1. If bit 1 of address SHiFTING is equal to 1, the program proceeds to step 103 where all of bits 0, 1, and 2 of address SHiFTING are cleared. It is readily seen that since the content of address G becomes equal to the content of address $G_{NEW}$, bit 1 of address SHiFTING is set equal to 1 upon completion of gear shifting operation. After step 103, the program goes to step 104 where the content of address $P_T$ is set equal to the maximum value (MAX). In subsequent step 105, the content of the shift timer $T_S$ is cleared. Then, the program goes to step 112 where the content of address $P_T$ is converted into digital value indicative of a duty factor by using a conversion table stored in the ROM 42 and the result is stored in address I. With this conversion table, a value 100% is set as the duty factor if the content of address $P_T$ is set equal to the maximum value. In step 113, the content of address I is output via the I/O 46, causing the electric current passing through the solenoid 7c to be a maximum, thus following the level of the output hydraulic pressure of the electromagnetic operated valve 7 to increase to the level of the line pressure.

If in step 102 bit 1 of address SHiFTING is not equal to 1, the program proceeds to step 106 where a decision is made whether bit 2 of address SHiFTING is set equal to 1. If bit 2 of address SHiFTING is not equal to 1, the program proceeds to step 107 where the bit 2 of address SHiFTING is set equal to 1 and then goes to step 108 where the control goes to execute the program shown by the flowchart of FIG. 5 so as to determine values to be set in addresses $P_T$ and $T_T$, respectively.

Figure 6C:
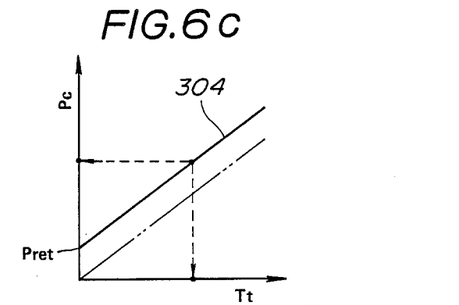
FIG. 6c shows the engagement hydraulic pressure $P_C$ (solid line) as a function of the transmission torque Tt of the torque converter.

Referring to FIG. 5, in step 200, the output signals of the revolution speed sensors 10 and 12 are read via the I/O 46 and the results are stored in the the addresses Ne and Ni, respectively, and the CPU 40 performs calculation of the equation Ne/Ni and stores the result in address e. After this step 200, the program goes to step 201 where the computer performs a table look-up operation using the content of address e. Two tables are stored in the ROM 42 for this operation. One is a torque ratio table as illustrated by a solid line 300 in FIG. 6b, and the other is an input torque capacity coefficient table as illustrated by a solid curve 302 in FIG. 6b. The result of the table look-up operation of the torque ratio table 300 is stored in address t, and the result of the table look-up operation of the input torque capacity coefficient table 302 is stored in address $\tau$ (tau). In subsequent step 202, the computer performs calculation of the equation $t \times \tau \times Ne^2$ and stores the result in address Tt. The content of the address Tt thus represents the value of torque transmitted to the transmission input shaft 4a via the torque converter 3. In step 203, the computer performs a table look-up operation using the content of address Tt. A $P_C$ vs. Tt characteristic table as illustrated by a solid line 304 in FIG. 6c is stored in the ROM 42. The result of the table look-up operation of the table 304 is stored in address $P_C$. The solid line 304 can be expressed by the following equation:

$$P_C = k_C \times Tt \times Pret$$

where, $k_C$: a coefficient determined depending upon the area of an actuating piston of a frictional element, the frictional coefficient, etc;

Pret: a bearing stress due to a return spring of the frictional element.

The content of address $P_C$ thus represents a value of hydraulic pressure required to engage the frictional element. With the value of hydraulic pressure represented by the content of address $P_C$, the frictional element cannot cause a change in inertia (a change in gear position) which must take place within the power train during a gear shifting operation, there is needed an additional value of hydraulic pressure which is combined with the above-mentioned value of hydraulic pressure to cause the above-mentioned change in inertia within the power train. With the same vehicle speed, the total of the above-mentioned change in inertia is basically constant for a given change between gear positions and can be expressed by the following equation:

$$E = R_I \times No$$

where:

E: energy due to the inertia;

$R_I$: a constant determined for the given change in gear position;

No: a transmission output shaft revolution speed (vehicle speed).

It will now be seen that the value of hydraulic pressure to be added to cause the above-mentioned change in inertia is proportional to the vehicle speed. This relationship is illustrated by the solid line 306 in FIG. 6d.

Figure 6D:
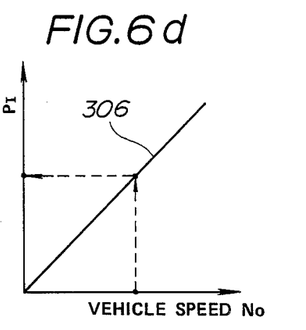
FIG. 6d shows an inertia compensating hydraulic pressure $P_I$ as a function of vehicle speed.

In step 204, the computer performs a look-up operation of a table, which is stored in the ROM 42 and which is illustrated by the solid line 306 in FIG. 6d. This table look-up operation is performed using the content of address No. The result of this table look-up operation is stored in address $P_I$. In subsequent step 205, the computer adds the content of address $P_I$ to the content of address $P_C$ and stores the result in address $P_T$. The content of address $P_T$ thus represents a target value of hydraulic pressure.

Figure 6E:
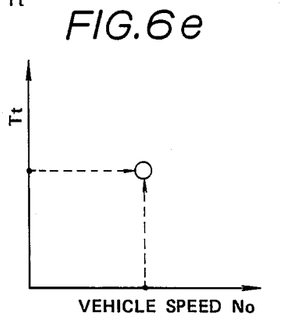
FIG. 6e diagrammatically illustrates a data table containing values of time required for change between gear positions as a function of a variation of vehicle speed and a variation of transmission torque Tt of the torque converter.

In step 206, the computer performs a look-up operation of a shift time table stored in the ROM 42. This shift time table contains values of time required for gear shifting operation as a function of vehicle speed (transmission output shaft revolution speed No) and torque transmitted to the transmission input shaft (Tt). FIG. 6e diagrammatically illustrates how to locate a value based on vehicle speed No and torque transmitted to the transmission input shaft Tt. The result of the table look-up operation performed in step 206, is stored in address $T_T$. After step 206, control goes to step 109 of the flowchart shown in FIG. 4.

Referring to FIG. 4, in step 109, the shift timer Ts is increased by a value 1. Then, the program proceeds to step 110 where a decision is made whether the content of the shift timer Ts is greater than the content of address $T_T$. If the content of the shift timer Ts is less than the content of the address $T_T$, the program goes to step 111. In step 111, the computer perform a closed loop (feedback) control to bring an error or deviation toward zero. In this embodiment, proportional, time integral, and differential control is performed. The computer reads the output signal of the pressure sensor 15 via the I/O 46 and stores the result and calculates the deviation of this stored result from the content of address $P_T$ to determine the value of the deviation. Based on the value of this deviation, the computer performs an operation to calculate the proportional, time integral, and differential of the deviation. Based on the result of the above-mentioned operation, the computer peforms the table look-up of and stores the result in address I in step 112. Then, the content of address I is output in step 113. If in step 110 the content of the shift timer Ts is greater than the content of $T_T$, the program goes to step 103. It will be seen that the comparison step 110 is provided to prevent the frictional element from generating frictional heat to an excessive great degree by causing control to proceed along steps 103, 104, 105, 112, and 113 so as to increase the level of the hydraulic fluid pressure supplied to the frictional element to the level of the line pressure.

If the response characteristic of the actuator 7 and the operational stability thereof are statisfactory, the feedback control in step 111 may be eliminated and the program may go from the comparison step 110 to step 112 directly where the computer performs the table look-up operation based on the content of address $P_T$ which has been stored in step 108.

Referring back to FIG. 5, it is to be noted that if the frictional element is a clutch which itself is subject to centrifugal force due to its rotation, the value of hydraulic fluid pressure stored in step 204 in address $P_I$ has to be determined considering a change in the hydraulic fluid pressure due to the centrifugal force. More specifically, the above-mentioned value in the hydraulic pressure is set low enough to compensate for the above-mentioned change due to the centrifugal force.

The explanation of the programs along with the flowcharts 4 and 5 can be fully understood by referring to the timing diagram shown in FIG. 7. FIG. 7 illustrate the manner of variations of signals used in the flowcharts during an upshift operation from second gear to the third gear.

Although the programs illustrated by the flowcharts of FIGS. 4 and 5 are for control during the upshift operation, a downshift operation can be controlled by similar programs which are not substantially different from them. In the case of downshift operation, the value stored in address $P_I$ becomes negative, whereas during an upshift operation this value is always positive.

As will now be appreciated from the preceding description of the embodiment according to the present invention, a target value of hydraulic pressure supplied to a frictional element that is to be engaged for effecting a shifting operation is determined in response to the magnitude of the torque actually transmitted to a transmission input shaft so that the control system can be used with different engines as long as the specifications of a torque converter remains unchanged.

What is claimed is:

1. A hydraulic pressure control system for reducing engagement shock of a frictional element in an automatic transmission, the automatic transmission having a transmission input shaft and a transmission output shaft, the transmission input shaft being drivingly connected to a turbine runner of a hydrodynamic torque-transmitting device which has a pump impeller drivingly connected to a crankshaft of an engine, said control system comprising:
   hydraulic pressure-generating means for generating a hydraulic pressure supplied to the frictional element;
   control means for controlling said hydraulic pressure-generating means such that the level of the hydraulic pressure generated is adjusted to a target value of hydraulic pressure,
   1. said control means including means for determining the amount of torque transmitted via the hydrodynamic torque-transmitting device to the transmission input shaft, and determining the target value in response to the transmitted amount of torque.

2. A hydraulic pressure control system for reducing engagement shock of a frictional element in an automatic transmission, the automatic transmission having a transmission input shaft and a transmission output shaft, the transmission input shaft being drivingly connected to a turbine runner of a hydrodynamic torque-transmitting device which has a pump impeller drivingly connected to a crankshaft of an engine, said control system comprising:
   hydraulic pressure-generating means for generating a hydraulic pressure supplied to the frictional element;
   sensors which generate output signals indicative of the rotational speeds of the crankshaft of the engine, the transmission input shaft, and the transmission output shaft;
   a control unit receiving the output signals from said sensors and generating an output signal to be supplied to said hydraulic pressure-generating means, said control unit including memory means for storing data as to operating characteristics of the hydrodynamic torque-transmitting device as a function of the speed ratio of the rotational speed of the engine crankshaft to the rotational speed of the transmission input shaft,
   said control unit also including means for performing operations based on the data stored in said memory means to determine the amount of torque transmitted to the transmission input shaft, then to determine a target value of hydraulic pressure to be supplied to the frictional element in response to the amount of torque transmitted to the transmission input shaft, and then to vary the output signal supplied from said control unit to said hydraulic pressure-generating means in response to the target value such that said hydraulic pressure-generating means is caused to adjust the level of the hydraulic pressure generated thereby to the target value.

3. A hydraulic pressure control system as claimed in claim 2, wherein said memory means also includes data as to values of hydraulic pressure required to engage the frictional element as a function of various values of the amount of torque transmitted to the transmission input shaft and data as to values of hydraulic pressure to be added as a function of various values of the rotational speed of the transmission output shaft, and said control unit utilizes the data of values of hydraulic pressure required to engage the frictional element and the data of values of hydraulic pressure to be added in determining the target value of hydraulic pressure to be supplied to the frictional element.

4. A hydraulic pressure control system as claimed in claim 3, wherein the operating characteristics include the torque ratio and the input torque of the hydrodynamic torque-transmitting device and the input torque capacity coefficient thereof.

5. A hydraulic pressure control system as claimed in claim 4, wherein said sensors include a rotational speed sensing means for measuring the rotational speed of the engine crankshaft, a rotational speed sensing means for measuring the rotational speed of the transmission input shaft, and a rotational speed sensing means for measuring the rotational speed of the transmission output shaft.

6. A hydraulic pressure control system as claimed in claim 4, further including a pressure sensor means for generating an output signal indicative of the level of the hydraulic pressure generated by said hydraulic pressure-generating means, the output signal of said pressure sensor means being supplied to said control unit.

7. A hydraulic pressure control system for reducing engagement shock of a frictional elements in an automatic transmission, the automatic transmission having a transmission input shaft and a transmission output shaft, the transmission input shaft being drivingly connected to a turbine runner of hydrodynamic torque-transmitting device which has a pump impeller drivingly connected to a crankshaft of an engine, said control system comprising: a first rotational speed sensor for generating a first output signal indicative of the rotational speed of the pump impeller of the hydrodynamic torque-transmitting device;
   a second rotational speed sensor for generating a second output signal indicative of the rotational speed of the turbine runner of the hydrodynamic torque-transmitting device;
   means for determining the amount of torque transmitted by the hydrodynamic torque-transmitting device in response to the first and second output signals and generating a third output signal indicative of the transmitted amount of torque;
   means for determining a target value of hydraulic pressure based on the third output signal;
   hydraulic pressure-generating means for generating a hydraulic pressure supplied to the frictional element; and means for adjusting the hydraulic pressure generated by said hydraulic pressure-generating means to the target value.

8. A hydraulic pressure control system as claimed in claim 7, wherein said means for determining the amount of torque includes means for storing input torque capacity coefficient data for the hydrodynamic torque-transmitting device and torque ratio data therefore, the data being retrievably arranged as a function of various values of the ratio of the rotational speed of the pump impeller to the rotational speed of the turbine runner of the hydrodynamic torque-transmitting device.

* * * * *